(No Model.)
W. G. CHAPIN.
FLUID METER.
No. 299,737.  Patented June 3, 1884.
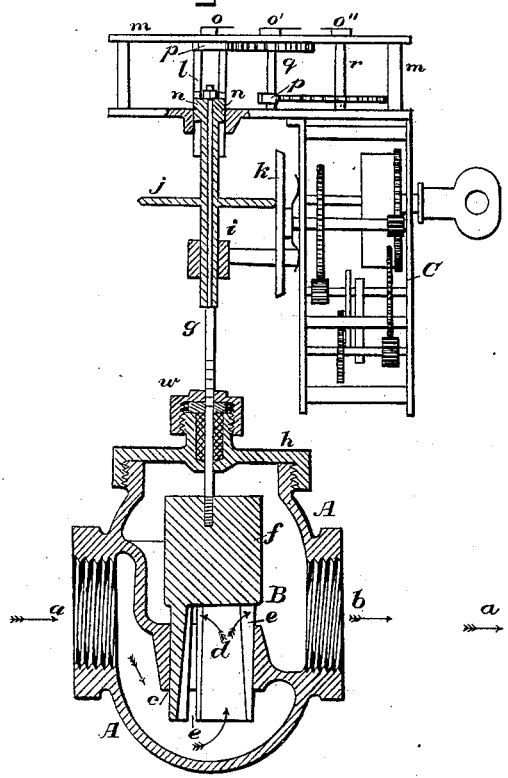
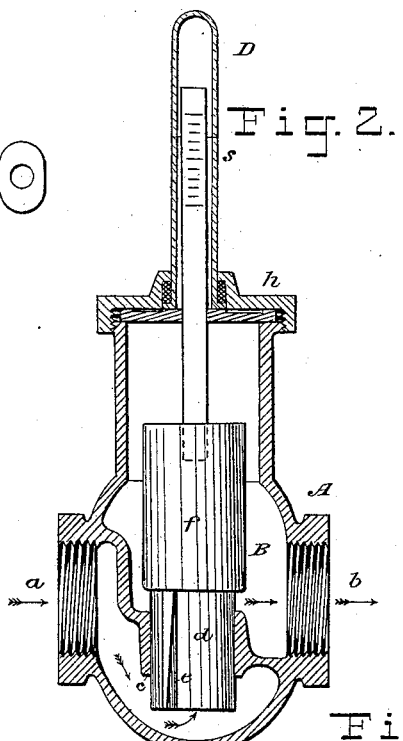
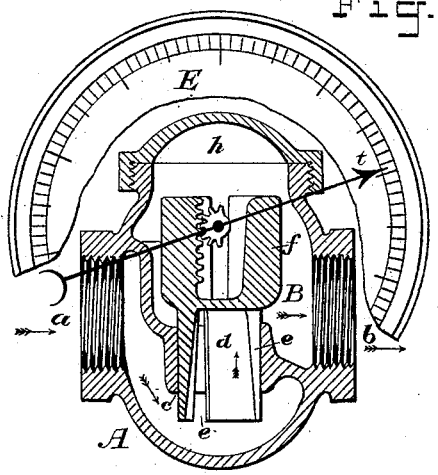
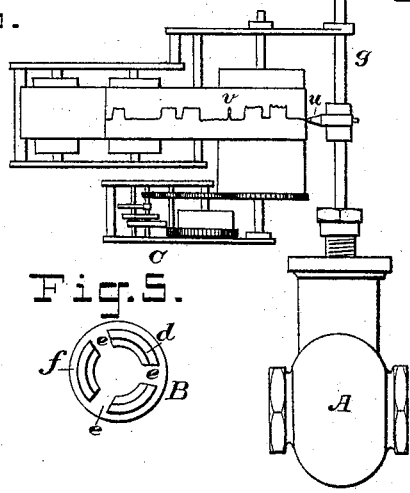
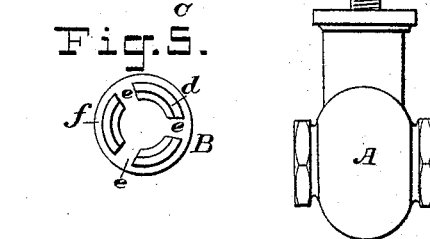
WITNESSES:
Geo. H. Fraser
E. B. Bolton
INVENTOR:
William G. Chapin
By his Attorneys,
Burke, Fraser & Connell

United States Patent Office.

WILLIAM G. CHAPIN, OF BROOKLYN, NEW YORK.

FLUID-METER.

SPECIFICATION forming part of Letters Patent No. 299,737, dated June 3, 1884.

Application filed August 13, 1883. (No model.)

*To all whom it may concern:*

Be it known that I, WILLIAM G. CHAPIN, a citizen of the United States, residing at Brooklyn, Kings county, New York, have invented certain Improvements in Fluid-Meters, of which the following is a specification.

The object of my invention is to measure the quantity of any fluid, under pressure, which passes a point in a conduit or pipe in a given time, and it is particularly adapted for measuring steam, compressed air, and water under a head.

My invention comprises, as to the meter, a valve or gate arranged in the pipe or conduit through which the fluid passes, and adapted to retard in some degree the passage of the fluid at that point, and thereby maintain a difference between the pressure on the inlet side and the outlet side of the valve. The valve closes normally by its weight or by a spring, and it is lifted and the opening for the passage of the fluid more or less enlarged according to the rapidity with which the fluid is removed at the outlet; consequently the more rapidly the fluid is drawn off or used the higher the valve will stand. The altitude of the valve then being the measure of the flow, it is only necessary to apply to this an indicator, recorder, or register properly adjusted, and the flow per second may be always ascertained.

In the drawings, which serve to illustrate my invention, Figure 1 is a vertical mid-section of my improved meter and a registering device attached thereto. Fig. 2 is a vertical mid-section of a modification of the indicator connected with the meter. Fig. 3 is a vertical mid-section of the meter and another form of indicator. Fig. 4 is a view showing the meter in elevation and a pencil-recorder. Fig. 5 is a plan of the bottom of the meter-valve.

Referring first to Fig. 1, A is the shell of the meter, which may be somewhat in the form of a globe-valve. $a$ is the inlet, and $b$ the outlet. In a partition which separates the inlet from the outlet is a valve-aperture, $c$, in which fits and plays a piston-valve, B. This valve may have almost any form, so long as its rise or lift is proportionate to the area of the passage thus opened, and so long as the fluid in its passage through the valve and seat changes its direction and flows out laterally. It is not absolutely necessary that the lift should be in direct proportion to the area of the opening uncovered thereby, but it simplifies the register. It also conduces to the accuracy of the register to construct the valve in such a manner that the lift will be quite considerable in proportion to the area of the opening uncovered. Therefore I construct the piston portion $d$ of the valve (see Fig. 5) in the form of a hollow cylinder, and form slits $e\ e$ in it longitudinally. In order that there may be a normal difference between the pressures on the inlet and outlet sides of the valve—say of about two pounds to the square inch—I provide the valve with a weight, $f$, which may form a part of the valve itself; or, if the meter is so set that a gravity-valve cannot be employed, a spring can be substituted for the weight $f$. The pressure should be maintained uniform at the source by a pressure-regulator, if necessary; but this will not be necessary in most cases. Assuming, then, that the pressure is uniform at $a$ at sixty pounds to the square inch, and the valve B is held down to its seat with a pressure of two pounds, as long as no fluid is being supplied the valve will remain closed; but when the outlet $b$ is opened, the pressure will be reduced on the outlet side of the valve just in proportion to the amount drawn off, and the valve B will rise to a height corresponding exactly to the amount of fluid that must pass to supply the waste and keep up the normal difference of pressure. Now, if the waste or discharge cock be slowly closed, the valve will as slowly descend until, when the flow ceases, the valve will be seated.

In order to indicate or record the passage of the fluid and measure its volume, I may employ any indicating, registering, or recording device whatever that is adapted to be actuated or controlled by the movement of the valve. In Figs. 1 and 4 I have shown instruments which will record or register the flow per minute, and thus give the volume. In Figs. 2 and 3 I have shown merely indicators to show fluctuations, and to designate the volume flowing per minute at any given time. In many cases these last will be sufficient to approximate the amount used in a day. Indeed, where the flow is quite regular these will answer all the purposes of a recorder or register.

Referring again to Fig. 1, $g$ is a stem affixed to the valve B, and arranged to play, as the valve rises and falls, through a stuffing-box in the cap $h$ of the shell A. On the slender upper end of this stem is mounted a tubular shaft or sleeve, *i*, to which is fixed a friction-wheel, *j*. Shaft *i* and wheel *j* move up and down with valve B and its stem, but rotate freely on the valve-stem. C represents, in general, an ordinary clock mechanism driven at a uniform speed by a spring, and arranged to drive a friction-disk, *k*, at a uniform speed. The axis of *k* is at right angles to the axis of *j*, and *k* is pressed into elastic contact with *j* by a spring behind it. The disk *k* drives *j*, and the velocity imparted to *j* is directly proportional to the distance the point of contact is from the axis of *k*, and this of course is controlled by the rise and fall of the valve. When the valve is seated and no fluid is passing, then the point of contact is at the axis of *k*, and it imparts no motion at all to *j*. Fig. 1 shows the valve raised.

I will now describe the means I employ for imparting the rotary motion of shaft *i* to a recorder or register.

The upper end of shaft *i* slips into a tubular shaft, *l*, which is mounted rotatively in frame *m*, and it turns shaft *l* by reason of lugs *n* on it, which play in slots in *l*. On the end of shaft *l* is the unit hand or pointer *o*, the unit-dial being on the upper face of *m*, and not visible in Fig. 1. On *l* is a pinion, *p*, with one tooth, which drives the ten-shaft *q*, bearing the ten-hand *o'* over the ten-dial on *m*, and on shaft *q* is a pinion, *p'*, with one tooth, which drives the hundred-shaft *r* with the hundred-hand *o''*. This device of the single-toothed pinions, their shafts, and the dials is a common device in registers, and I make no claim to it.

In the modification Fig. 2 I have shown the same form of meter as in Fig. 1, but a different form of indicator. On the top part, A', of the shell fluid is admitted above the piston from the outlet side *b* through a passage in the valve and piston. (Indicated by the dotted lines.) On the top of the cap *h* is mounted a glass tube, D, with a zero-mark at *s*, and the stem *g* of the valve is graduated; or the glass might be graduated and the mark *s* be on the stem. This is merely an indicator; but it has the merit of being devoid of friction, which must be taken into account where stuffing-boxes are employed.

Fig. 3 shows a meter precisely like that in Fig. 1, except that it is provided with an indicator comprising a dial, E, and hand *t*. The hand is fixed on a cross-shaft bearing a pinion, and the pinion meshes with a rack on the valve. The operation is obvious and will require no description.

Fig. 4 shows the adaptation of a pencil-recorder to the meter. On the valve-stem *g* is mounted a pencil or marker, *u*, arranged to bear on a strip of paper, *v*, borne along under it by clock mechanism C in a well-known way.

In order that my meter shall perform its duties properly, it is only necessary for elastic fluids that the pressure of the fluid shall be uniform on the inlet side; that the valve shall have a predetermined load in order that a normal difference of pressure between the inlet and outlet may be maintained, and that the amount of fluid that passes the meter be indicated in some manner through the altitude of the valve or the area of its opening. This last might be effected by simply graduating the stem *g* of the valve, as shown in Fig. 1, and noting the number of the graduated line at the level of the stuffing-box cap *w*. Such an indicator might be employed in connection with the register shown, if desired, as it would show the amount of fluid passing at any moment.

Where the fluid is non-elastic—as water, for example—it is not important that the initial head be uniform, as the load on the valve will be the same.

Fluids of different densities should have different meters; but the same meter may be employed for all, if correction-tables be used.

Allowance may be made for the friction and contraction of the fluid by giving the valve-opening a little greater area in proportion to the altitude of the valve when the valve is nearly closed. This may be done by making slits *e* a little wider at top than at bottom.

Herein I have used the term "altitude of the valve" to express the area of opening for the passage of the fluid, which increases as the altitude increases; but it would be possible to employ a rotary or oscillating valve in lieu of that shown.

I find that the friction of the valve-stem in the stuffing-box is not very important where it is only a fractional part of the weight *f*. I do not allow for this friction by an increase in the weight of *f*, for the pressure tending to close the valve being opposed by the friction, as well as the pressure tending to lift it, one error counterbalances the other, so far as the friction is concerned, and the mean normal difference of pressure is maintained.

Having thus described my invention, I claim—

1. The combination, to form a fluid-meter, of the shell constructed as shown, its valve B, provided with a weight, *f*, or a spring, a slotted cylindrical portion, *d*, and a stem, *g*, and means, substantially as shown, for indicating the rise and fall of the valve, all constructed substantially as set forth.

2. The combination, in a fluid-meter, of the shell A, constructed as shown, the loaded valve B and its stem, the hollow shaft or sleeve *i* on the valve-stem, provided with lugs *n*, the wheel *j*, the wheel or disk *k*, and means, substantially as described, for imparting rotary motion thereto, the shaft *l*, and pointer *o*, all arranged to operate substantially as set forth.

In witness whereof I have hereunto signed my name in the presence of two subscribing witnesses.

WILLIAM G. CHAPIN.

Witnesses:
HENRY CONNETT,
GEO. BAINTON.